United States Patent [19]

Brotz

[11] Patent Number: 4,896,150
[45] Date of Patent: Jan. 23, 1990

[54] THREE-DIMENSIONAL IMAGING SYSTEM

[76] Inventor: Gregory R. Brotz, P.O. Box 1322, Sheboygan, Wis. 53081

[21] Appl. No.: 182,920

[22] Filed: Apr. 18, 1988

[51] Int. Cl.$^4$ .............................................. G09G 3/00
[52] U.S. Cl. ..................................... 340/795; 340/729; 358/88
[58] Field of Search ............... 340/795, 729, 720, 700; 358/88, 90; 350/3.6, 3.61, 3.66, 6.5, 6.6

[56] References Cited

U.S. PATENT DOCUMENTS

| | | | |
|---|---|---|---|
| 2,777,011 | 1/1957 | Marks | 358/88 |
| 3,555,349 | 1/1971 | Munz | 358/88 |
| 3,636,551 | 1/1972 | Maguire | 358/88 |
| 4,041,476 | 8/1977 | Swainson | 340/795 |
| 4,359,758 | 11/1982 | Teacherson | 358/90 |
| 4,376,950 | 3/1983 | Brown et al. | 358/90 |
| 4,408,277 | 10/1983 | Cortellini et al. | 358/90 |
| 4,442,455 | 4/1984 | Huignard et al. | 350/3.64 |
| 4,472,737 | 9/1984 | Iwasaki | 358/88 |
| 4,566,031 | 1/1986 | Kirk | 358/90 |

Primary Examiner—Leo H. Boudreau
Assistant Examiner—Jeffrey A. Brier
Attorney, Agent, or Firm—William Nitkin

[57] ABSTRACT

A three-dimensional television system having a view chamber with electrode vibration plates disposed above and below the viewing chamber with a plurality of minute particles moving rapidly back and forth between the vibration plates and illumination of selected of the particles provided at a desired height in the viewing chamber at a pluarlity of positions within the viewing chamber to provide a three-dimensional image based upon an image-sensing device's output directed to control the point of illumination within the viewing chamber.

7 Claims, 2 Drawing Sheets

THREE-DIMENSIONAL IMAGING SYSTEM

BACKGROUND OF THE INVENTION

1. Field of the Invention

The system of this invention resides in the field of three-dimensional imaging and more particularly relates to a system to create a televised three-dimensional image.

2. Description of the Prior Art

There has been much work in the past directed toward the production of a televised three-dimensional image which does not rely on the viewing of different images by each eye of the viewer, which viewing now requires the viewer to wear special glasses to cause each eye to see only one of such images. It has been desired to have a three-dimensional image which is viewed normally by an observer without special glasses. Toward that end many holographic systems have been developed, for example Three-dimensional Television System Using Holographic Techniques, U.S. Pat. No. 4,376,950; to Brown which illustrates a system of holograms which are observed in three dimension. Other holographic systems have also been presented such as Holographic Television by Teacherson, U.S. Pat. No. 4,359,758 which also uses holographic images for the production of a television image. More complex systems have tried to create images from holographic systems where the image is angularly multiplexed over a series of matrixes of dot members supported by wires in a number of planes. Such a system is found in U.S. Pat. No. 4,408,277 to Cortellini et al for A Holographic Imager which illuminates points on selected of a series of such matrixes. Other systems incorporate in their structure wave detection materials which have plates which can be electrically conductive with a contained area of thin liquid medium, of a type of material which is affected by a scanning beam against the plate causing portions of the medium contained therein struck by such beam to become transparent. Such plates with mediums interacting with signals have been used in combination with other equipment to produce a display such as seen in U.S. Pat. No. 4,442,455 to Hulgnard entitled Optical System for Observation in Real Time with Scanning. Similar plates have also disclosed in U.S. Pat. No. 4,566,031 issued to Kirk for Spatial Light Modulation with an Application to Electronically Generated Holography. The medium between these plates is generally opaque until activated wherein it becomes transparent for the transmission of light. The Kirk patent uses dipolar particles which are activated between a plurality of plate members for data signals to be derived from the entire structure.

SUMMARY OF THE INVENTION

It is an object of this invention to provide a new system for the production of a directly viewable three-dimensional image. To accomplish this a viewing chamber is provided with electrodes above and below such chamber as will be described below. The viewing chamber containing a large plurality of charged vibrating particles moving in a plane back and forth between the electrodes at a fast rate. These particles are selectively sequentially illuminated by the system of this invention and an image is formed in the chamber which can be viewed by an observer.

It is a further object of this invention to provide a viewing chamber which receives television signals and which can produce the image of those signals in a directly viewable three-dimensional image form.

An object to be viewed in three-dimension in the viewing chamber of this invention is, in one embodiment, photographed simultaneously at different angles by at least two television cameras. More television cameras could be utilized as well as other image-sensing means as described below. The images from these television cameras are processed by a computer and, in one embodiment, are digitized to control a laser the output of which is directed on the viewing chamber of this invention in a sequence of positions by a rotating and pivoting mirror also controlled by such computer. The viewing chamber of this invention which will be described in further detail below receives such laser beam output thereon and produces a three-dimensional image therein viewable directly by an observer. The viewing chamber, in a first embodiment, contains first and second spaced-apart transparent electrode vibration plates between which is suspended in a vacuum a large plurality of minute charged particles which are made to vibrate in a flat plane between the two electrodes' vibration plates at approximately 8 cycles/second using high voltage or static discharge between the electrode vibration plates. The electrode vibration plates have a sufficient charge thereto to maintain the pulsing plane of particles in a high state of static charge therebetween so that such particles are dispersed evenly throughout the moving plane of particles. The viewing chamber can be optically transparent so that between the plates an observer from a side or end can view the area containing the suspended particles but the plane of moving particles will not be visible because of their small size until they are illuminated. When a beam, such as a laser beam strikes the transparent electrode vibration plate, it passes therethrough and strikes a particle(s) in the moving plane of particles when it moves to a desired height in the viewing chamber thus illuminating that particle(s). As the laser beam is pulsed in relation to, for example, a cathode ray tube output derived from a television cameras, the beam is directed by a rotating and moving mirror to a sequential series of positions on the electrode vibration plate. As the rotating mirror directs the pulsed beam made up of a series of discrete pulses to a large number of positions from side-to-side and front-to-rear on the electrode vibration plate, the particles in the path of each beam are illuminated. The position of the plane of particles determines the height in the chamber of the illuminated spot. An image is produced within the viewing chamber when many spots are illuminated at close time intervals which image can be perceived through the viewing chamber's transparent sides. Colored three-dimensional images can also be produced as will be described below.

In another embodiment carbon electrode plates can be disposed immediately exterior to each electrode vibration plate. The carbon electrode plates are maintained at a voltage that is just below that voltage necessary to produce a spark arcing between the carbon electrode plates. When a beam, such as a laser beam, strikes the outer carbon electrode plate, the spot where the beam strikes the carbon electrode plate causes the temperature of that spot to rise which local higher temperature causes an increase in the electrical conduction of that spot which in turn causes a spark arc to form from that spot to the opposite carbon electrode plate. Selected particles in the viewing chamber are illuminated by each spark arc ionizing those particles in its path. The moving mirror as described above can direct the beam to a desired position on the carbon electrode plate to cause a spark arc to form at each position between the two carbon electrode plates, and a large number of arcs is created within a short time period in the viewing chamber.

In a further embodiment of the viewing chamber, the electrodes can be positioned on both ends of an upright cylindrical transparent viewing chamber. A typical cathode ray tube-type image signal can be directed against one end of the viewing chamber. Such signal can be controlled as any scanning television image beam but when such beam, which would normally activate the phosphors at the front of a television screen, strikes the bottom end of the cylindrical viewing chamber against the carbon electrode plate, it decreases the resistance of the carbon electrode plate where struck by the signal beam causing a spark arc to occur as described above with the local ionization and illumination of a spot in the plane of particles at its desired position within the chamber in the path of the arc. In this way the viewing chamber can be directly activated by the electron beam of a cathode ray tube to produce a three-dimensional image when viewed from the side. As the beam scans the carbon electrode plate, a series of arcs would occur with accompanying particle illumination. In this way the beam is pulsed and scanned synchronously according to the incoming image information and which beam causes the carbon electrode plates to produce spark arcs to cause illumination of the particles at the desired plane position in such arcs' paths as described above causing the particles therein so illuminated to create an image. The sides of this cylindrical structure can be of transparent material so that the image could be viewed from any side.

To produce colors in the direct laser illumination of the particles embodiment, the viewing chamber of this invention can be activated by red, yellow and blue laser beams which receive image information from an image source such as through a camera through a computer which controls the pulsing of the beams through a synchronizer. Each laser can provide a beam that reflects a different color off the particle(s). Each laser can direct its pulsed beam directly or through a series of mirrors to the mirror scanner which can rotate to direct the beam to illuminate desired particle spots. The colors of the beams can be combined in various combinations to produce all colors.

DESCRIPTION OF THE PREFERRED EMBODIMENT(S)

Figure 1:
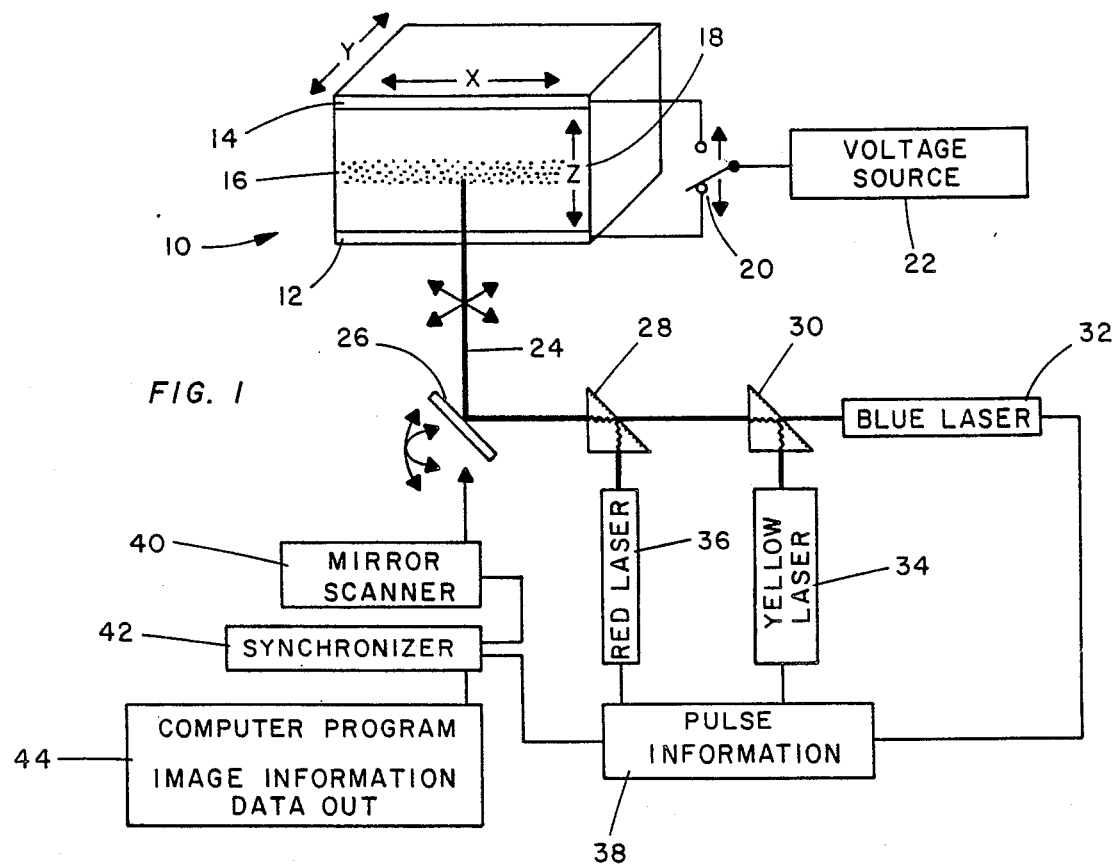
FIG. 1 illustrates a viewing chamber of this invention with a series of lasers for direct particle illuminations, such lasers correlated to produce a color image.
Figure 2:
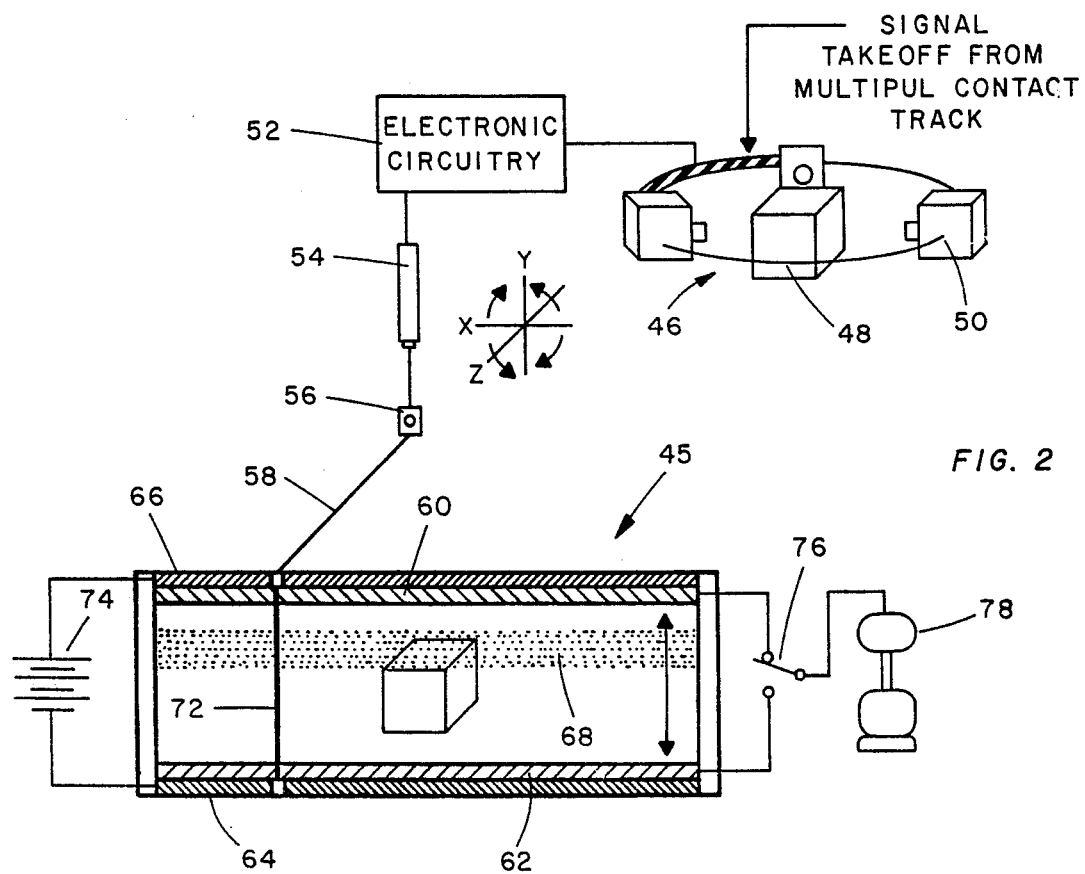
FIG. 2 illustrates a side cutaway view to a viewing chamber of this invention utilizing spark arc illumination.

FIG. 1 illustrates a side cutaway view of viewing chamber 10 of this invention which has contained therein a plurality of minute charged suspended particles 16 arrayed in a plane. The front of the chamber facing the viewer is transparent and the chamber is sealed with a vacuum therein. At the top and bottom of the chamber are first and second transparent electrode vibration plates 12 and 14, respectively. These electrode plates which can be made of a conductive transparent material such as natural crystal or equivalent are adapted to keep particles 16 suspended in a moving narrow plane within the viewing chamber by providing between the first and second electrode vibration plates 12 and 14 a series of static or high voltage alternating charges within the chamber. The electrode vibration plates could also be made of a sandwich of thin glass containing a conductive fluid such as salt water or of a clear conductive material such as polyacetylene. To accomplish this moving suspension, a static generator or high voltage generator 22 provides a current to electrodes 20 where the current direction of the electric charge changes at the eighth cycle/second rate. The current direction changes cause the plane of particles 16 to move rapidly back and forth between electrode vibration plates 12 and 14. At any position as they move the particles are not yet visible because they are so minute. The particles are not visible unless light is shined upon them or they are activated in some other way to illuminate. The particles are suspended in the chamber not only through the entire length of the visible chamber but also through the depth of the chamber extending away from the viewer. Viewing chamber 10 has a length X and a depth Y and a height Z. The length X along the top and bottom electrode vibration plate 12 and 14 runs along the length of the front viewing surface. The depth Y extends to the depth of the electrode plates and the height Z is the spacing between the plates through which the suspended particles 16 move back and forth in a plane as illustrated. These particles 16 are adapted to be struck by light directed from a source. Once struck by light from a source, they are visible in the same way that dust particles may be visible in a room when struck by sunlight but are invisible because of their minute size when not illuminated. By directing a light beam on the electrode vibrating plate which is transparent, the light passes therethrough at a desired point to strike a single or group of particles of the suspended plane of particles 16 creating an illuminated spot. Along the X-Y axis one can orient the position of the spot's illumination and when determining the proper height of the particle plane 16 on the Z axis, one can position the illuminated spot not only at any height in the chamber but at any depth. When one illuminates a large number of particles in a very fast sequence, one can create an image within the chamber that is three-dimensional in appearance because it has all the components of length, depth and height to the image. In a direct illumination chamber 10, the light spot can be directed thereto by a variety of means including a rotating and moving mirror such as mirror 26. Other equivalent means could be utilized to direct the light spots from a mirror and many types of imaging beams, as long as they produce light on the spot, could be utilized as will be discussed below. The rotating mirror 26 aims a beam such as one from a laser to a spot on the X-Y axis of viewing chamber 10 and when the particle plane 16 is at the proper height Z within the chamber, the beam is pulsed and the spot desired is illuminated. As mentioned, by illuminating many of these spots, an image that is three-dimensional can be formed which can be directly viewed by an observer. In order to create such images, many techniques of image creation can be utilized. One such technique is seen in FIG. 2 a photographic cameras 46 and 50 photograph an object 48 which is a cube. The image information is processed by a computer 44 through electronic circuitry and that image information is digitized and directed by a synchronizer 42 first to control the movement of the mirror scanner 26 to aim a beam 24 at the proper X-Y coordinates and the synchronizer 42 then controls the pulse information 38 to, for example, a series of lasers such as lasers 32, 34 and 36. The pulse information 38 directs a pulse to be made at the time when the plane of particles 16 is at the proper height Z, and when so pulsed, a spot in viewing chamber 16 is illuminated. By controlling the combination of mirror movement and pulsing, one can create a visible image within the viewing chamber of this invention. In order to create colors, one can utilize a series of colored lasers such as red laser 36, yellow laser 84 and blue laser 32 which are reflected through half-silvered mirrors, for example mirrors 28 and 30, in order to direct all of their beams to the same point on mirror 26. The blue laser projects through half-silvered mirrors 28 and 30 while the beams of yellow laser 34 and red laser 36 are reflected off the inner reflective surfaces of mirrors 28 and 30 to mirror 26. In this way combinations of the various colors of the laser beams can be additively made so as to create a final color of the pulsed beam to create a colored image. For example, if the image spot is red, then the red laser would alone pulse the beam off mirror 26 to the spot through vibrating electrode 12. If the image spot is to be green, both the blue and yellow lasers would combine their beams in a combination of color to create the green image. By combining all the colors in the well-known additive type of color imagery, any color can be created to reflect off a particle moving within the particle plane 16.

Electronic circuitry 52 processes the image information from the cameras to determine by ranging between the two images the height, length position and depth of all spots within the systems resolution and processes these to be duplicated by the pulsed lasers aimed by the mirror in coordination with the particle plane height in the viewing chamber. Other image sensing means could be used to determine such spot positions such as scanning radar or sonar equivalents. Colors can be determined also by cameras to enhance each image spot with color.

In FIG. 2 a similar scanning mirror 56 projects its beam 58 onto the top of viewing chamber 45 wherein the vibrating electrode members 60 and 62 propel the planar particles 68 back and forth on the Z axis within chamber 45. In this chamber, though, there is no direct illumination because located above first and second electrode vibration plates 60 and 62 are carbon electrode plates 64 and 66. The carbon electrode plates extend over and under the entire length and depth of the viewing chamber. Both carbon electrode plates 64 and 66 have a voltage power source 74 interconnected therebetween which provides the minimum charge necessary to almost cause a spark to jump between the plates through the viewing chamber 45. Upper carbon electrode plate 66, though, will produce a spark gap at any point on its surface between the electrode plate 66 and carbon electrode plate 64 should there be any local spot temperature rise on its surface which lowers the resistance and creates a higher conduction at that particular point. Should the temperature rise on any particular point of carbon electrode plate 66, spark arc 72 will pass through the viewing chamber and such spark arc will ionize the particles in the particle plane 68 in its path to cause the particles to produce light which would be visible from the side of the chamber. In order to produce an image, upper carbon electrode plate 66 is struck at a plurality of positions in a very fast sequence by a beam such as produced by laser 54. The laser produces a signal as directed by the multiple television cameras 46 and 50 which are disposed around object 48 being photographed by such cameras. Electronic circuitry 52 processes the images received from television cameras 46 and 50 of object 48 and also controls the rotating and moving mirror 56 and the pulsing of laser 54. In this way the image is broken down by electronic circuitry 52 which then causes the laser to pulse a beam and the mirror to direct such beam to a position on upper carbon electrode plate 66. As mirror 56 rotates, it aims the series of discrete beam pulses 58 and the points where the pulses land on carbon electrode plate 66, the temperature at those locations increases and the resulting higher conduction causes a spark arc 72 to jump between the first carbon electrode plate 66 and the second carbon electrode plate 64 creating the illuminized particles as described above. Speedy scanning movement of the mirror to direct the beam to a large number of positions very quickly creates a large number of spark arcs and particles illuminated by the ionization by the arc within the viewing chamber 45. Since the image forming area not only has width but also depth and height, the image will appear 3-dimensional because of the signals taken from the camera as processed by electronic circuitry 52. Laser 54 can radiate in the infrared spectrum to create a localized spot increase in temperature in the upper carbon electrode plate 66. In this way a spot on the vibrating plane of particles 68 is ionized at a desired height and illuminated for the period of time that the arc is passing therethrough. Once the beam 58 that is directed by mirror 56 moves to the next spot on the carbon electrode plate, the ionized particles in the first arc will cease to produce light and the next group of illuminated particles will. In this way the beam can quickly scan the entire upper surface of the carbon electrode plate 66 as would a scanning beam on a television screen with a large number of beam directed per second and an image will be created as viewed from the side. It should be noted that the viewing chamber can be of various sizes and shapes, not necessarily the size that is illustrated herein.

Figure 3:
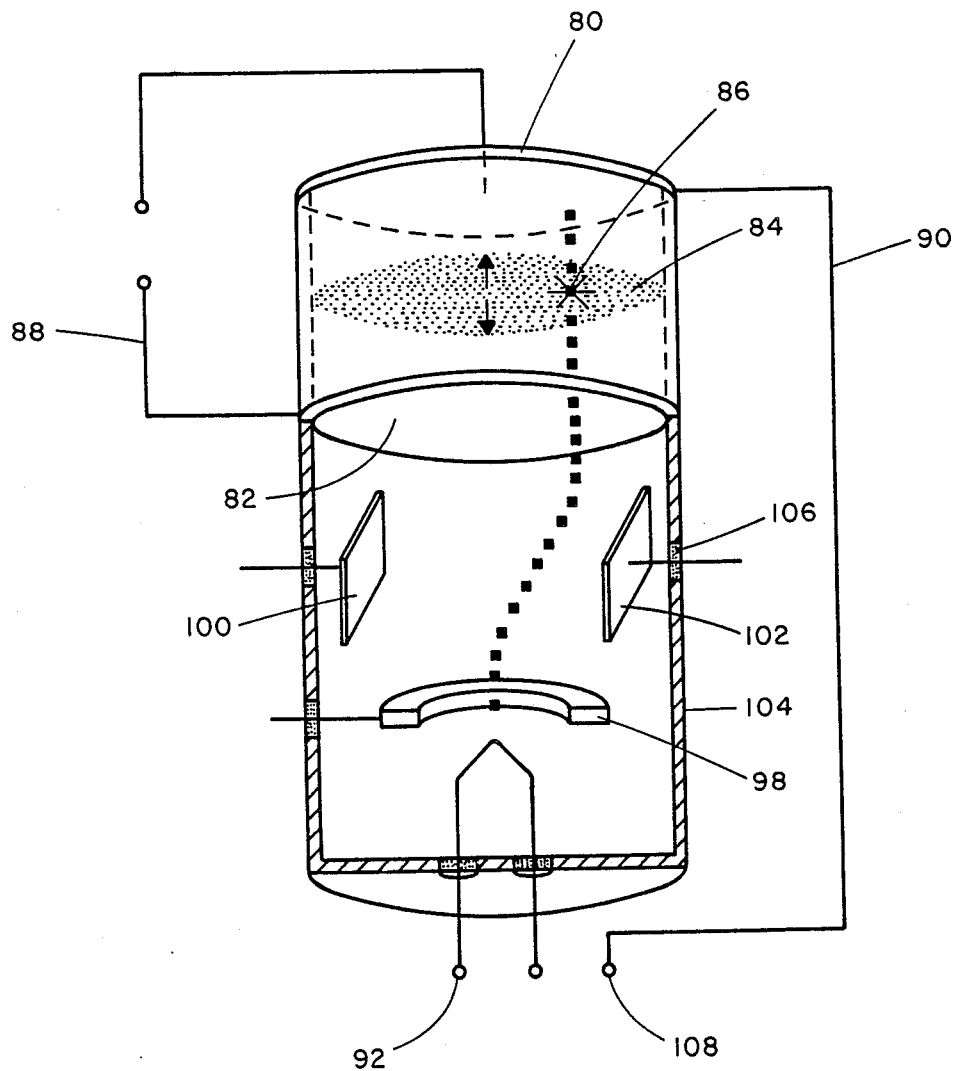
FIG. 3 illustrates an alternate embodiment of the device of this invention wherein the viewing chamber is activated by the beam of a cathode ray tube.

FIG. 3 illustrates a further alternate embodiment wherein an upright cylindrical chamber 84 is provided at the end of tube 104 which is similar to the cathode ray-type tubes in a normal television screen. If such chamber were disposed so that the particle plane were moving at an angle, the plane might not have even movements due to the force of gravity. In this version the sides of the chamber 84 can be transparent as well as the end of chamber 80 which is comprised of a carbon electrode plate and the electrode vibration plates as described above. Also bottom carbon electrode plate 82 is further comprised of a carbon electrode plate and an electrode vibration plate with the charge alternating at 8 cycles/second from contact point 88 to maintain the particles 86 in suspension within viewing chamber 80. The power source to carbon electrode 90 can also be controlled by the cathode ray-type tube as can part of the electrode to the lower carbon electrode plate. Field coil 98 with carbon electrode plates 101 and 102 control the cathode ray image beam which is directed against the bottom of carbon electrode plate 82 which beams heat then causes the spark arc to form within the viewing chamber and the arc then proceeds through the chamber ionizing the particles in the plane in its path which illuminated particles can be viewed from the sides or top of chamber 80 depending on the nature of the signal produced by the cathode ray tube which would be directed by the computerized information provided thereto. In this way the image within the viewing chamber can be directly controlled by a cathode ray tube scanning its beam thereagainst. It should be noted that the carbon electrode plate that is first struck can be conductive or insulative and since at high voltages most materials will conduct, the carbon electrode plates do not have to be as electrically conductive as the electrode vibration plates and such carbon electrode plate being struck by the beam can have insulative qualities. It should be further noted that the outer carbon electrode plate and vibration plate in the embodiment illustrated in FIG. 3 can be made of materials that are transparent for viewing from the top depending upon the nature of the image orientation as provided by the computerized control of the system.

Although the present invention has been described with reference to particular embodiments, it will be apparent to those skilled in the art that variations and modifications can be substituted therefor without departing from the principles and spirit of the invention.

I claim:

1. A three-dimensional television system comprising:
a viewing chamber having a top and bottom, said viewing chamber also having a length, a depth and a height;
first and second electrode plates positioned at the top and bottom of said viewing chamber;
means to rapidly alternate a charge's direction between said first and second electrode plates;
a plurality of minute particles formed in a narrow plane along the length and depth of said viewing chamber, said plane of particles moved by said alternating charge causing said particles to move rapidly in a plane between said first and second electrode plates; and
means to illuminate selected of said particles at a desired position in said viewing chamber.

2. The device of claim 1 further including:
image sensing means having an output;
image processing means to convert said image sensing means, output into pulsing information and beam direction information;
a beam source producing a beam sufficient to illuminate said particles directed by said pulsing information;
beam aiming means directed by the beam direction information, said beam aiming means directing said beam on said first electrode plate at a position where it is desired to illuminate said selected particles.

3. The device of claim 2 wherein said top electrode plate is transparent and said pulsed beam is directed through said top electrode plate to strike in sequence selected particles in said plane of particles at a desired length, depth and particle height in said viewing chamber to illuminate said selected particles to form a visible image.

4. The device of claim 2 wherein said beam is of sequenced colors to create a colored image in said viewing chamber.

5. The device of claim 2 wherein said beam is produced by a laser device.

6. The device of claim 2 further including:
top and bottom carbon electrode plates positioned respectively above and below said top and bottom electrode plates;
a voltage source providing voltage to said carbon electrode plates at a voltage level just below that sufficient to cause a spark to jump between said carbon electrode plates; and
said top carbon electrode plate adapted when struck by said beam to be locally heated thus reducing resistance at said heated spot to increase said spot's conductivity and causing a spark arc to pass between said carbon electrode plates at that spot, such spark arc ionizing said particles in its path causing them to generate visible light.

7. The device of claim 6 wherein said beam is produced by a cathode ray beam.

* * * * *